United States Patent

Schlesiger et al.

(10) Patent No.: US 6,509,461 B2
(45) Date of Patent: Jan. 21, 2003

(54) PROCESS FOR PRODUCING PARTICULATE, WATER-SOLUBLE CELLULOSE DERIVATIVES

(75) Inventors: Hartwig Schlesiger, Fallingbostel (DE); Martin Morning, Bomlitz (DE); Gunter Weber, Fallingbostel (DE); René Kiesewetter, Fallingbostel (DE); Rudolf Lelgemann, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 44 days.

(21) Appl. No.: 09/788,116

(22) Filed: Feb. 16, 2001

(65) Prior Publication Data

US 2001/0034441 A1 Oct. 25, 2001

(30) Foreign Application Priority Data

Feb. 28, 2000 (DE) .......................... 100 09 409

(51) Int. Cl.$^7$ .............................. C08B 11/00
(52) U.S. Cl. ................. 536/124; 536/127; 536/128; 536/84; 536/90
(58) Field of Search .................. 536/124, 128, 536/84, 90

(56) References Cited

U.S. PATENT DOCUMENTS

| | | | |
|---|---|---|---|
| 2,331,864 A | 10/1943 | Swinehart et al. | 260/232 |
| 4,044,198 A | 8/1977 | Kostrzewa et al. | 536/86 |
| 4,399,522 A | 8/1983 | Kotecha | 365/185 |
| 4,415,124 A | 11/1983 | Carduck et al. | 241/28 |
| 4,747,550 A | 5/1988 | Jäckering | 241/55 |
| 4,820,813 A | 4/1989 | Schulz | 536/84 |
| 4,979,681 A | 12/1990 | Dönges et al. | 241/17 |
| 5,845,855 A | 12/1998 | Yamada et al. | 241/57 |
| 5,921,479 A | 7/1999 | Doenges et al. | 341/18 |
| 6,021,966 A | 2/2000 | Doenges et al. | 241/57 |

FOREIGN PATENT DOCUMENTS

| | | |
|---|---|---|
| DE | 3032778 | 4/1982 |
| DE | 3811910 | 4/1997 |
| EP | 0 835 881 | 4/1998 |
| GB | 804306 | 11/1958 |
| GB | 2262527 | 6/1993 |
| WO | 96/00748 | 1/1996 |
| WO | 98/31710 | 7/1998 |

OTHER PUBLICATIONS

Ullmann's Encyclopaedia of Industrial Chemistry, 5$^{th}$ Edition, (month unavailable) 1986, vol. A5 pp. 461–488, VCH Verlagsgesellschaft, Weinheim, Cellulose Ethers, Lothar Brandt.

*Primary Examiner*—Dwayne C. Jones
(74) *Attorney, Agent, or Firm*—Joseph C. Gil; James R. Franks

(57) ABSTRACT

The present invention relates to a new, particularly economical process for producing particulate water-soluble cellulose derivatives. The process involves forming a feed composition of swollen and/or dissolved cellulose derivative, and water. The feed composition is contacted with a carrier and heat exchange gas, in a sieve-free high rotational speed gas jet impact mill, and the cellulose derivative of the feed composition is converted into a solid state form of finely particulate particles. The particulate cellulose derivative is then separated from the heat exchange gas and carrier gas, and optionally dried. The mill drying and the particulate cellulose derivative product are influenced by establishing a specific water content in the swollen and/or dissolved cellulose derivative.

15 Claims, No Drawings

PROCESS FOR PRODUCING PARTICULATE, WATER-SOLUBLE CELLULOSE DERIVATIVES

CROSS REFERENCE TO RELATED PATENT APPLICATION

The present patent application claims the right of priority under 35 U.S.C. §119 (a)–(d) of German Patent Application No. 100 09 409.0, filed Feb. 28, 2000.

FIELD OF THE INVENTION

The present invention relates to a process for the production of particulate water-soluble cellulose derivatives, preferably those with a thermal flocculation point.

BACKGROUND OF THE INVENTION

After the reaction and optionally after removing the byproducts formed in the reaction, cellulose derivatives, in particular cellulose ethers, are present in friable, particulate or wad-like form. In this form the cellulose derivatives still have the predetermined structures imparted by the raw materials. Thus for example cellulose ethers generally still exhibit the fiber-like structure of the initial cellulose. These cellulose derivatives are thus unsuitable for their intended use, for example as products soluble in organic and/or aqueous media.

It is typically also necessary to adjust specific grain size distributions, bulk densities, degree of dryness and viscosity values for the various areas of use.

In principle almost all cellulose derivatives therefore have to be compacted, ground and dried in order to make them suitable for use.

The industrially important cellulose derivatives include in particular the cellulose ethers, whose production, properties and applications are described for example in:

Ullmann's Encyclopaedia of Industrial Chemistry, 5th Edition (1986), Volume A5, pages 461–488, VCH Verlagsgesellschaft, Weinheim; and Methoden der organischen Chemie, 4th Edition (1987), Volume E20, Makromolekulare Stoffe, (Methods of Organic Chemistry) (Macromolecular Substances) Part-Volume 3, pages 2048–2076, Georg Thieme Verlag Stuttgart.

U.S. Pat. No. 2,331,864 describes a process in which a water-moist cellulose ether is adjusted at temperatures of >50° C. to a water content of 72–88 wt. %. The cellulose ether is then cooled to temperatures of <50° C. The gel that is thus obtained is dried at temperatures >50° C. and the dried material is ground.

GB-A 804 306 describes a process for dissolving cellulose ethers soluble in cold water by cooling a hot mixture of the fibrous cellulose ether and water (98–65 wt. %). The cellulose ether is precipitated by renewed heating, and dried. The dried product is ground.

DE-A 952 264 discloses a three-stage process for converting moist, fibrous methyl celluloses into powders that dissolve rapidly. In this case the product, which contains 50–70 wt. % of water, is first of all homogenized to a plastic mass and cooled to 10° to 20° C., a cooled screw press being used for this purpose; the product is then ground with a hammer mill and dried in a circulating air dryer.

EP-A 0 049 815 (which is equivalent to U.S. Pat. No. 4,415,124) describes a two-stage process for the production of micronised powders of cellulose ethers or cellulose, in which the products, which have a fine fibrous or woolly structure, are first of all converted into a brittle solidified form, and the thus treated material is subjected to a grinding operation until a grain size distribution of at least 90% below 0.125 mm is achieved. Vibratory mills or ball mills, preferably cooled, or pellet presses are used in the embrittlement stage, and jet mills, pinned disc mills or impact disc mills are used in the grinding stage.

DE-A 30 32 778 discloses a two-stage process for the continuous homogenization of moist cellulose ethers, in which the moist cellulose ether is subjected to cutting, impact and shear forces generated by circulating rotating bodies having various jacket profiles, optionally with the simultaneous pelletising of the comminuted cellulose ethers with the addition of water, followed by drying of the resultant pellets.

EP-A-0 370 447 describes a process for the gentle grinding and simultaneous drying of moist cellulose ethers, in which a cellulose ether having an initial moisture content of 20 to 70 wt. % is conveyed by means of a carrier gas and at the same time is friction comminuted to an impact comminution size and is dried by the grinding energy to a residual moisture content of 1 to 10 wt. %.

EP-A-0 384 046 describes a process for the production of cellulose ether particles, comprising the comminution in a high rotational speed, air jet rotary impact mill to a particle size of 0.4 to 0.035 mm of cellulose ethers with a viscosity of greater than 100 Pa·s, measured as a 2% aqueous solution at 20° C. using an Ubbelohde tube.

WO 96/00748 discloses a process for the comminution of cellulose ethers, comprising the extrusion of a hydrated cellulose ether through openings with a cross-sectional area of 0.0075 mm$^2$ to 1 mm$^2$ (7.5×10$^{-9}$ m$^2$ to 1×10$^{-6}$ m$^2$) and cutting the resultant extruded material to the desired length.

EP-A-0 835 881 describes a process for the production of methyl cellulose powders with a special particle-size distribution curve by adjusting a methylhydroxyalkyl cellulose granular material to a moisture content of 30 to 70 wt. % with water, followed by grinding in a rotary mill, the product being simultaneously dried by the imparted grinding energy. A special particle-size distribution curve is established by size classification.

U.S. Pat. No. 4,044,198 describes a process for the cold grinding of cellulose derivatives, in which the cellulose derivative with a water content of 40–150 wt. % of water, referred to its dry weight, is cooled with liquid nitrogen and subjected to cold grinding.

U.S. Pat. No. 4,044,198 describes a process in which crude products obtained by the etherification of cellulose are washed almost salt-free with hot water and are then separated at high temperatures by centrifugation to a water content of 50 wt. % referred to the total mass, and are next adjusted by mixing with water to a water content of 60 to 70 wt. % referred to the total mass. These mixtures are compacted, granulated, dried and ground.

The known processes according to the prior art are for the most part multi-stage processes involving a preliminary drier or preliminary embrittlement and/or compaction. Furthermore, in all the known processes the chemical and/or thermal stress on the macromolecules, particularly when processing extremely viscous, highly substituted products, is always also so intense that during the grinding the macromolecules are decomposed in the form of a chain scission, which is noticeable in particular by the more or less large decrease in viscosity compared to the starting products. Also the surfaces of the products treated by the preliminary embrittlement and/or preliminary drying steps become rough. Furthermore, a common feature of all the processes is the large amount of energy expended in grinding the cellulose derivatives after the preliminary drying, embrittlement or compaction.

Processes are already known that avoid one or more of the aforementioned disadvantages. For example, GB-A 2 262 527 describes a process for the comminution of cellulose derivatives by gelling a cellulose ether with a water content of 30 to 80 wt. % by cooling to a temperature of −10° to 60° C. followed by mill drying of the gel (preferably in an impact mill). Unfortunately GB-A 2 262 527 does not give any indication of how to proceed with hydroxyethylated mixed ethers of methyl cellulose (such as for example methylhydroxyethyl cellulose or methylhydroxypropylhydroxyethyl cellulose) in order to obtain a product having a bulk density of greater than 300 g/l. If a methylhydroxyethyl cellulose is processed as described in GB-A 2 262 527 for the case of methylhydroxypropyl cellulose, then wad-like products having a bulk density of <250 g/l are obtained. Also, the product from the-mill drying of methyl cellulose (Example 3) with a bulk density of 270 g/l is not satisfactory.

WO 98/31710 describes a process for the production of finely particulate polysaccharide derivatives by gelling or dissolving a cellulose ether with 35 to 99 wt. % (preferably 60 to 80 wt. %) of water referred to the total weight, followed by mill drying, wherein superheated steam is used to transport and dry the ground material.

Thus for example MHEC gels that have a dry substance content of 20 wt. % referred to the total mass are obtained by cooling a hot suspension. These gels are then processed into powders in the following stage. It is unfortunately technically extremely complicated to cool hot suspensions, as described in WO 98/907931, and no instructions are given for a continuous process.

This process likewise avoids many of the aforementioned disadvantages. However, the comminution in this mill drying process is still not sufficient, and only 57 wt. % of the comminuted methyl-hydroxyethyl cellulose passes through a 0.063 mm sieve (Example 3). The desired fineness is achieved only by a size classification by means of an air jet sieve. Moreover the use of pure steam as carrier gas and heat exchange gas has disadvantages as regards the operational safety of the grinding plant since films and encrustations quickly form due to condensation of water together with the finely particulate polysaccharide derivative. The expenditure on maintenance measures is thus increased. Finely particulate products that pass in an amount of more than 95 wt. % through a 0.1 mm sieve or even in an amount of more than 90 wt. % through a 0.063 mm sieve are obtained according to the above application only by dispersing dissolved polysaccharide derivatives in a non-dissolving ambient medium, followed by comminution, filtration and drying steps (Examples 1 and 2).

The object of the present invention is accordingly to provide a process for the production of particulate water-soluble cellulose derivatives, in which:

degrees of grinding can be selectively adjusted;
particle-size distribution curves having a proportion of >65 wt. %<0.063 mm can be established;
there is no roughening of the surface of the products;
the bulk densities of the products can be adjusted;
there is no decrease or only a minimal decrease in viscosity compared to the starting products; and
a free flowing product is obtained.

SUMMARY OF THE INVENTION

In accordance with the present invention, there is provided a process for producing particulate water-soluble cellulose derivatives, comprising:

a) forming a feed composition comprising 20 wt. % to 50 wt. % of a cellulose derivative, based on the total weight of the feed composition, and 50 wt. % to 80 wt. % of water, based on the total weight of the feed composition, wherein the cellulose derivative is at least one of swelled and dissolved in the feed composition;

b) contacting, in a high rotational speed impact mill, the feed composition with a heat exchange gas and carrier gas, (thus converting at least a portion of the water of the feed composition into the vapor phase), thereby converting the cellulose derivative of the feed composition into a solid state form of finely particulate particles;

c) separating the particulate cellulose derivative from the heat exchange gas and carrier gas; and d) optionally drying the particulate cellulose derivative.

Other than in the operating examples, or where otherwise indicated, all numbers expressing quantities of ingredients, reaction conditions, etc. used in the specification and claims are to be under stood as modified in all instance by the term "about." As used in the specification and in the claims, the symbol "<" means "less than," and the symbol ">" means "greater than."

DETAILED DESCRIPTION OF THE INVENTION

It was found that the cellulose derivatives produced by this process have a high bulk density combined with a good flowability, and the proportion of fines in the product is very low. There is no reduction or only a minimal reduction in viscosity compared to the starting products.

The cellulose derivatives that are used in this process are soluble or at least swellable in water. For the most part the derivatives were obtained by reacting cellulose with an alkylating agent or hydroxyalkylating agent. They may contain one or more substituents of the type: hydroxyethyl, hydroxypropyl, hydroxybutyl, methyl, ethyl, propyl, dihydroxy-propyl, carboxymethyl, sulfoethyl, hydrophobic long-chain branched and unbranched alkyl radicals, hydrophobic long-chain branched and unbranched alkylaryl radicals or arylalkyl radicals, cationic radicals, acetate, propionate, butyrate, lactate, nitrate and sulfate. Wherein some of these radicals, such as for example hydroxyethyl, hydroxypropyl, hydroxybutyl, dihydroxypropyl and lactate are able to form grafts, and the substituents of the polysaccharide derivatives according to the invention are not restricted to the aforementioned radicals.

Examples of cellulose derivatives are hydroxyethyl cellulose (HEC), hydroxypropyl cellulose (HPC), ethylhydroxyethyl cellulose (EHEC), car-boxymethylhydroxyethyl cellulose (CMHEC), hydroxypropylhydroxyethyl cellulose (HPHEC), methyl cellulose (MC), methylhydroxypropyl cellulose (MHPC), methylhydroxy-propyl-hydroxyethyl cellulose (MHPHEC), methylhydroxyethyl cellulose (MHEC), carboxymethyl cellulose (CMC), hydrophobically modified hydroxyethyl cellulose (hmHEC), hydrophobically modified hydroxypropyl cellulose (hmHPC), hydrophobically modified ethylhydroxyethyl cellulose (hmEHEC), hydrophobically modified carboxymethylhydroxyethyl cellulose (hmCMHEC), hydrophobically modified hydroxypropylethylhydroxyethyl cellulose (hmHPHEC), hydrophobically modified methyl cellulose (hmMC), hydrophobically modified methylhydroxypropyl cellulose (hmMHPC), hydrophobically modified methylhydroxyethyl cellulose (hmMHEC), hydrophobically modified carboxymethylmethyl cellulose (hmCMMC), sulfoethyl cellulose (SEC), hydroxyethylsulfoethyl cellulose (HESEC), hydroxypropylsulfoethyl cellulose (HPSEC), methylhydroxyethyl-sulfoethyl cellulose (MHESEC), methylhydroxypropylsulfoethyl cellulose (MHPSEC), hydroxyethylhydroxypropylsulfoethyl cellulose (HEHPSEC), carboxymethylsulfoethyl cellulose (CMSEC), hydrophobically modified sulfoethyl cellulose (hmSEC), hydrophobically modified hydroxyethylsulfoethyl cellulose (hmHESEC), hydrophobically modified hydroxypropylsulfoethyl cellulose (hmHPSEC), and hydrophobically modified hydroxyethylhydroxypropylsulfoethyl cellulose (hmHEHPSEC).

The amount of alky substituents are usually descripted by the "DS". DS is the averge amount of OH-radicals which is substituted in the glucose unit. The substitution of methyl is descripted by the term "DS (M)". The substitution of hydroxyalkyl is descripted by the term "MS". This is the average amount of mols of the etherification agent bounded to the glucose unit. The substitution of ethylene oxide is descripted by the term "MS (ME)". The substitution of propylene oxide is descripted by the term "MS (HP)".

The value of DS(M), MS (HE) and MS (HP) is determined by the method of Zeisel p.e. according to G. Bartelmus, R. Kellerer, Z. Anal. Chem. 286 (1977), 161–190.

Particularly preferred cellulose derivatives are cellulose ethers with a thermal flocculation point in water, such as for example methyl cellulose, methylhydroxyethyl cellulose, methylhydroxypropyl cellulose, methyl-hydroxypropylhydroxyethyl cellulose and hydroxypropyl cellulose. Most preferred are methylhydroxyethyl celluloses with a DS (M) of 1 to 2.6 and a MS (HE) of 0.05 to 0.9, in particular those with a DS (M) of 1.3 to 1.9 and a MS (HE) of 0.15 to 0.55, and methylhydroxypropylhydroxyethyl celluloses with a DS (M) of 1 to 2.6 and a MS (HP) of 0.05 to 1.2 and a MS (HE) of 0.05 to 0.9, in particular those with a DS (M) of 1.3 to 1.9 and a MS (HP) of 0.05 to 0.6 and a MS (HE) of 0.15 to 0.55.

The water solubility of the cellulose derivatives having a thermal flocculation point in water is highly temperature dependent. Below the thermal flocculation point these cellulose derivatives form solutions and/or gels. The thermal flocculation point in water describes the temperature at which the cellulose derivative undergoes heat coagulation.

Predominant structures resulting from the cellulose starting material are destroyed by the swelling or dissolution process. Thus in the case of cellulose ethers the fibre-like structure is almost completely lost, and only the fraction of the cellulose ether whose derivatisation is sufficient is swollen or dissolved. The swollen or dissolved cellulose derivatives thus obtained contain less than 25 to 50 wt. % referred to the solids fraction of soluble or swellable material in the initial state.

The resulting swollen and/or dissolved cellulose derivatives of the feed composition constitute viscoelastic systems whose general properties correspond, according to the amount of solvent and cellulose derivative, to a solution that can flow under its own weight, to a flexible gel, or to a soft but brittle solid.

The amount of water in the feed composition is chosen so as to achieve a sufficient swelling or dissolution in order to destroy the predominant structures and obtain the desired bulk density. The amount is conveniently 50 to 80 wt. %, preferably 65 to 78 wt. % and most particularly preferably 68 to 76 wt. % of water, based on the total weight of the feed composition. It has surprisingly been found that a minimum specific water content is necessary in order to achieve a desired bulk density of the ground product. This value varies, inter alia, with the nature of the substituents, the degree of etherification and the molecular weight of the cellulose derivative. In general a higher etherification requires a lower water content. Also, in general a low molecular weight requires a low water content. It is recommended that in each case the optimum water content for the cellulose derivative to be processed be determined by preliminary test.

In one modification of the process cellulose ethers having a thermal flocculation point in water, preferably methyl cellulose, methylhydroxyethyl cellulose, methylhydroxypropyl cellulose, methylhydroxypropylhydroxy-ethyl cellulose, hydroxypropyl cellulose, are swollen or dissolved down to temperatures below the flocculation point by adding cold water, optionally with the aid of additional water, so that predominant structures, for example fibre structures, are largely destroyed. The cellulose ether is preferably used in the form of a water-moist filter cake. Water-moist filter cakes of methylhydroxyethyl cellulose, methylhydroxypropyl cellulose, methylhydroxypropylhydroxyethyl cellulose or methyl cellulose with a water content of 40 to 65 wt. % are particularly preferably used, to which additional water is added and which are then cooled. Cold water is preferably mixed in and the whole is then homogenised in a manner known per se. Thus for example water is continuously mixed in a twin-screw compounder and the mixture is then homogenised by applying shear forces and compounding. Co-rotating as well as counter-rotating machines are suitable, the co-rotating machines being preferred on account of the axial open access. The screw configuration must be adapted to the imposed conditions so as to achieve a sufficient compounding effect, while on the other hand the shear force must be suitably adjusted so that the material is not subjected to any unallowable stress, which could possibly lead to a decrease in the molecular chain length. So-called divided trough kneaders with two horizontally arranged agitator blades that engage deeply with one another and that perform a mutual stripping action, as in the case of twin-screw compounders, are characterised by a comparatively slight shear gradient (manufacturers IKA, List). By varying the rotational speed of the screws the required friction is generated in the kneaded cellulose derivative material and a good dispersion and homogenisation of the methyl cellulose with water is thereby achieved.

Single-shaft, continuous compounders suitable for the homogenisation include the so-called Reflector® compounders, which are high performance mixers of modular construction, consisting of a multi-part, heatable and coolable mixing cylinder and a unilaterally mounted blade mixer (manufacturer: Lipp). Also suitable are so-called pinned cylinder extruders or Stiftconvert® extruders (manufacturer: Berstorff), such as are used for the manufacture of unvulcanised and vulcanised rubber mixtures. The pins incorporated in the housing serve as abutments in order to prevent the kneaded material rotating together with the shaft. Single-shaft screw kneaders without movement barriers are unsuitable for the aforementioned task.

In order to adjust the residence time accurately and/or to control parallel diffusion-determined reactions, batch units are preferred to continuously operating types of apparatus. Kneader mixers with so-called double-blade sigma stirrers (manufacturer: Fima) in a horizontal assembly are particularly suitable for the aforedescribed task. The blades operate at different speeds and their direction of rotation can be reversed. A discharge screw is arranged in the saddle region for emptying the kneader. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). The stirrer arms are arranged so that, in addition to the thorough mixing of the total vessel contents, they also exert a downwardly directed compression effect so that the discharge screw mounted in the floor of the vessel is always fed with material. Also suitable for the batchwise homogenisation of cellulose derivatives with water are double-walled mixing vessels with a planetary stirrer and inline homogeniser. The planetary stirrer ensures that the vessel contents are intensively mixed and guarantees an almost encrustation-free cleaning of the temperature controllable inner wall of the vessel. A rotor-stator system connected in a bypass arrangement provides for an additional homogenisation.

The swollen or dissolved cellulose derivative of the feed composition is then converted, in a preferably sieve-free high rotational speed impact mill, into the solid state in such a way that at least a portion of the water contained in the feed composition is converted into the vapor phase, and in addition the dissolved and/or swollen cellulose derivative of the feed composition is converted by phase transition into a solid state form of finely particulate particles, wherein in these processes the structural change in the cellulose derivative is achieved by applying external forces (e.g., impact, shear forces).

The feeding of the cellulose derivative into the impact mill can be effected, depending on the consistency of the material to be fed, according to the prior art by means of feed devices known per se. A preliminary comminution of the strand material to be fed into individual strands, which may optionally also be separated in the transverse direction, may be carried out, in which connection the individual strands have cross-section areas of greater than 1 mm$^2$. The feed material for this purpose is preferably forced through a passing sieve and thereby formed into individual strands. Single-shaft or double-shaft screw mixers with a breaker plate attachment (meat mincer) may be used in a similar way. The endless strands may optionally be cut by means of a cutting tool into smaller sections after the breaker plate. With screw feeding it is possible to feed the extruded strands directly into the grinding zone.

The mill drying is carried out in a sieve-free high rotational speed impact mill, in which the cellulose derivative is subjected to impact and/or shear forces. Such mills are known (for example from U.S. Pat. No. 4,747,550, DE-A-3 811 910 or EP-A-0 775 526).

An inert gas, air, a mixture of steam and an inert gas, or air or steam is used as heat exchange gas and carrier gas for the mill drying, the amount of steam preferably being raised so that the water used as solvent for the cellulose derivative is evaporated. Arbitrary gases or gas mixtures with a dew point less than room temperature may be used as inert gases. Nitrogen, carbon dioxide, air, combustion gases or mixtures of these gases are preferably used. The temperature of the inert gas and/or of the air that is fed in may be chosen arbitrarily, although the temperature is preferably in the range 0°–300° C., and in particular inert gas and/or air is used in the temperature range 5°–50° C., preferably ambient temperature. The gas or gas mixture may be preheated by a heat exchanger, or may already be hot, as is the case with combustion gases. In the case where the mill gas is circulated, the inert gas and/or the air may be added at arbitrary points of the grinding unit. Thus for example coarse granular material may be recycled pneumatically to the grinding zone and the throughput may be chosen so that the desired amount of inert gas and/or air is fed. The addition of inert gas or air may take place for example at the suction side of the fan or together with the material to be ground. The addition of the inert gas and/or air may preferably also take place at the same time at various points in the grinding unit. The inert gas or air is added in a ratio relative to the fed vaporised water of 1:99 parts by weight to 60:40 parts by weight, preferably in a ratio of 3:97 parts by weight to 40:60 parts by weight, particularly preferably in a ratio of 5:95 parts by weight to 30:70 parts by weight. The fed water is added via the dissolved or swollen cellulose derivative and is evaporated in the mill drying procedure, or is fed directly into the mill in the form of water or steam. The evaporated amount of water is calculated as follows:

amount of steam (kg/h)=amount of water or steam fed in (kg/h)+ added amount of gel (kg/h)×wt. % of water in the gel/100 wt. %–throughput MC powder (kg/h)×wt. % moisture/100 wt. %.

Since the last term is generally very small compared to the first and second terms, the amount of steam may be calculated approximately as follows:

amount of steam (kg/h)=amount of water or steam fed in (kg/h)+ added amount of gel (kg/h)×wt. % of water in the gel/100 wt. %.

If no additional water or steam is fed into the mill, then the amount of steam is calculated approximately as follows:

amount of steam (kg/h)=added amount of gel (kg/h)×wt. % of water in the gel/100 wt. %.

Since the amount of gas circulating in the system is high relative to the added water and amount of inert gas and/or air, this ensures a thorough mixing of the steam with the inert gas and/or air.

The dissolved or swollen cellulose derivative is comminuted by multiple impacts and/or shear stress between the rotating and fixed or counter-rotating grinding machinery and/or by the impact of many particles. At the same time the solvent present in the solids is vaporised. The thermal energy required for this purpose is supplied only in part by the heat exchange gas. The electrical energy of the mill drive that is converted by friction into heat contributes at the same time to the drying.

The finely particulate solids particles are separated from the gas stream, for example in a separator connected downstream of the mill drying apparatus. The separator may be a gravity force separator, for example a cyclone, or may also be a filter separator. Depending on the design of the mill, a size classification by screening may also be carried out internally. Any oversize material that may be present is separated from the fines as a result of the centrifugal force, which overcomes the drag forces of the carrier gas. The fines are removed as finished material from the grinding chamber together with the carrier gas. The oversize material is recycled again to the grinding zone in an internal or external oversize material recycle system. The mill drying is carried out in such a way that no further size classification by screening or sieving is necessary. However, the coarse grain is preferably separated via a protective screening. Screens with a mesh width of 0.125 mm to 1 mm are used for this purpose. The separated coarse grain fraction is <15 wt. %, preferably <7 t. %, particularly preferably <3 wt. %, referred to the total weight of the mill-dried cellulose derivative. This separated coarse fraction may optionally be returned to the mill or added in small amounts to the feed material.

The heat exchange gas and carrier gas (mill gas) may be cycled, in which case the excess portion is then removed as a partial stream. The amount of circulating gas (kg/h) in the cycle is preferably in a ratio of 5 to 15, in particular in a ratio of 8 to 12, relative to the added water (kg/h) and amount of inert gas and/or air (kg/h). A heat exchanger is connected in front of the mill drying apparatus, and reheats the mill gas that has cooled as a result of the evaporation of the water contained in the cellulose derivative, and heat losses.

The steam contained in the extracted partial stream of mill gas may be condensed with recovery of heat, optionally after a hot gas filtration.

The finely particulate solids particles may optionally be dried to the desired moisture content in drying devices according to the prior art. The drying is conveniently carried out using convective dryers, preferably with pneumatic dryers, ring dryers or similar equipment. The mill drying is preferably carried out in such a way that a subsequent drying step is not necessary.

In order to modify the property profile of the end product, modifiers, additives and/or active substances may optionally be added before, during or after one or more of the steps of the process, i.e., swelling or dissolution of the cellulose derivative in water, mill drying of the swollen or dissolved cellulose derivative, and drying of the finely particulate cellulose derivative.

By the term modifiers are understood to be substances that have a chemical effect on the polysaccharide derivative. Typical modifiers are oxidising agents, for example hydrogen peroxide, ozone, hypohalides, perborates and percarbonates, as well as crosslinking agents, for example dialdehydes such as glyoxal or glutaric acid dialdehyde, polyfunctional epoxides, polyfunctional isocyanates, organic acids, mineral acids, organic and inorganic salts, though the list is not restricted to the above.

By the term additives are understood substances that do not have any chemical effect on the polysaccharide derivative. Typical additives are preservatives, dispersing agents, defoaming agents, air-entraining agents, pigments, non-ionic, anionic and cationic synthetic and natural polymers and their derivatives, for example starch ethers such as hydroxyethyl starch or hydroxypropyl starch, organic and inorganic salts, though the list is not restricted to the above.

By the term active substances are understood to be substances that do not have any chemical effect on the cellulose derivative and that utilise the cellulose derivative as a binder. Typical active substances are plant protection agents and pharmaceuticals, though the list is not restricted to the above.

The particulate cellulose derivatives of the present invention may be used in a large number of applications. They may be used for example as water-soluble or solvent-soluble thickening agents or binders in colouring agents, pharmaceuticals, cosmetics or foodstuffs. They may also be used as coating agents, for example in pharmaceuticals. A further use is as a protective colloid, for example in suspension polymerisation.

The products of this process are finely particulate cellulose derivatives, the predominant structures originating from the starting materials, e.g. fibre structures, being largely eliminated.

The finely particulate cellulose derivatives produced according to the process of the present invention are optionally analysed offline by means of laser diffraction processes for particle size determination (e.g. Sympatec HELOS (H1007)&RODOS).

The diffraction pattern is evaluated by first of all assuming that the particles are spherical and have a constant true density over the whole particle size spectrum. In this connection significant differences compared to products that have been produced according to processes of the prior art have surprisingly been found. Thus, with the process according to the invention products are found having less than 5 wt. %, preferably less than 2 wt. % referred to the total weight, of the particles with a particle size of less than 15 $\mu$m. Less than 2 wt. %, preferably less than 1 wt. % referred to the total weight, of the particles are found to be smaller than 10 $\mu$m, and less than 1 wt. %, preferably less than 0.5 wt. % and most particularly preferably less than 0.1 wt. % referred to the total weight, of the particles are found to be smaller than 5 $\mu$m.

The result is a substantially reduced proportion of fines and a narrower particle-size distribution compared to products according to the prior art.

By varying the rotational speed of the rotor and thus the circumferential speed of the rotor of the high rotational speed gas jet rotation impact mill, the degree of comminution and thus the particle-size distribution curve can be selectively adjusted. In order to control the operation of the mill it is therefore expedient to extract a part of the product stream behind the product separator (cyclone, filter separator) and analyse it continuously by means of a process for determining particle size. Alternatively a sampling and measurement system can be integrated directly into a conveyor line. Laser diffraction processes are preferably used for this purpose.

Narrow ranges as regards the desired particle-size distribution curves can be maintained by this procedure. It is thus possible selectively to adjust the degree of grinding, an accuracy of ±5 wt. % being achieved with respect to the cumulative sieving through a 0.063 mm sieve. The particle-size distribution curves that are obtained for the target sizes 40, 50, 60, 70, 80, 90 wt. %<0.063 mm for products with bulk densities in the range from 300 g/l to 500 g/l are listed hereinafter. Broader particle size distributions can be obtained by mixing powders of different particle-size distribution curves.

The analysis sieves correspond to DIN ISO 3310. The clear mesh widths specified hereinbelow correspond to USA-Standard ASTM E11–61 as follows:

| | ASTM E11-61 wt. % cumulative sieving |
|---|---|
| 0.25 mm | 60 mesh |
| 0.125 mm | 120 mesh |
| 0.063 | 230 mesh |
| Particle-size distribution curve A | |
| <0.25 mm | 98.5–100 |
| <0.2 mm | 95–100 |
| <0.16 mm | 89–98 |
| <0.125 mm | 79–92 |
| <0.1 mm | 65–80 |
| <0.063 mm | 35–45 |
| Particle-size distribution curve B | |
| <0.25 mm | 99–100 |
| <0.2 mm | 98–100 |
| <0.16 mm | 93–100 |
| <0.125 mm | 85–94.5 |
| <0.1 mm | 75–88 |
| <0.063 mm | 45–55 |
| Particle-size distribution curve C | |
| <0.25 mm | 99–100 |
| <0.2 mm | 98.5–100 |
| <0.16 mm | 95.5–100 |

-continued

| ASTM E11-61 wt. % cumulative sieving | | |
|---|---|---|
| <0.125 mm | | 89–96.5 |
| <0.1 mm | | 81–91.5 |
| <0.063 mm | | 55–65 |
| Particle-size distribution curve D | | |
| <0.25 mm | | 99.5–100 |
| <0.2 mm | | 99.0–100 |
| <0.16 mm | | 97.0–100 |
| <0.125 mm | | 93–98 |
| <0.1 mm | | 86–94.5 |
| <0.063 mm | | 65–75 |
| Particle-size distribution curve E | | |
| <0.25 mm | | 99.9–100 |
| <0.2 mm | | 99.5–100 |
| <0.16 mm | | 97.5–100 |
| <0.125 mm | | 95.5–99.5 |
| <0.1 mm | | 91–97 |
| <0.063 mm | | 75–85 |
| Particle-size distribution curve F | | |
| <0.25 mm | | 99.9–100 |
| <0.2 mm | | 99.5–100 |
| <0.16 mm | | 98.5–100 |
| <0.125 mm | | 96.5–99.9 |
| <0.1 mm | | 94–99.5 |
| <0.063 mm | | 85–95 |

The bulk densities of the finely particulate cellulose derivatives can be adjusted or controlled in the process according to the invention through the swelling and/or dissolution step (i.e., the feed composition formation step a)) from greater than or equal to 0.15 kg/l to greater than or equal to 0.5 kg/l. Preferably products are produced having a bulk density greater than or equal to 0.3 kg/l and less than or equal to 0.5 kg/l.

EXAMPLES

Example of Feed Composition Preparation

In a stirred vessel with a vertically arranged mixer shaft, on which the mixing implements are arranged so as to cover the whole mixing space, a water-moist filter cake of a methylhydroxyethyl cellulose with a water content of 55 wt. % referred to the total weight (of methylhydroxy-ethyl cellulose with a DS (methyl)=1.51 and a MS (hydroxyethyl)=0.28) was continuously mixed with water so as to produce a methylhydroxyethyl cellulose gel having a solids content of 25% referred to the total weight. In order to prevent the material rotating together with the mixer shaft, flow baffles are arranged on the vessel wall. The stirrer blades are arranged on the mixer shaft so that they, together with the thorough mixing, also exert a downwardly directed compression effect so that the discharge screw connected to the floor of the vessel is constantly fed with material. The gel (i.e., the feed composition) was collected and then processed further into finely particulate methylhydroxyethyl cellulose products (Examples MT 1, 4, 5).

Examples: Mill Drying (MT)

The grinding unit consists of a sieve-free high rotational speed gas jet rotary mill (type Ultra Rotor II, Altenburger Maschinen Jäckering GmbH) with a vertically arranged drive shaft and seven grinding tracks of 0.5 mm diameter with in each case 16 impact plates that operate against a profiled counter-grinding track. The circumferential speed of the rotor is determined by the rotational speed of the rotor and is calculated according to the formula $U=\pi \times n \times d$ where n=rotational speed of the rotor and d=0.5 m. The rotational speed of the rotor is regulated via the mill control system. A cyclone of 0.6 m diameter, where the main portion of the finely ground product is separated, is connected after the mill. The gas stream is then freed from residual dust in two bag filters each of 12 m² capacity connected in parallel. A radial fan is arranged on the clean gas side, which passes the dust-free gas stream to a heat exchanger where the mill gas is superheated to the required drying temperature.

The feed material (water-moist cellulose derivative) is metered by means of a metering screw into the mill at the height of the first and second grinding tracks. The feed material is cut into individual strands of ca. 10 mm diameter by means of a perforated plate connected in front of the metering screw. In addition nitrogen is metered into the apparatus at various points (fan, impact mill, cyclone). Overall the amount of added nitrogen is ca. 20 to 45 kg/h.

The excess steam/nitrogen is extracted and the steam is precipitated in a water jet fan.

Example 1

A methylhydroxyethyl cellulose gel (of methylhydroxyethyl cellulose with a DS (methyl)=1.51 and a MS (hydroxyethyl)=0.28) with a solids content of 25% referred to the total weight was ground and dried according to the aforedescribed procedure with a throughput of 114 kg per hour. The incoming steam/nitrogen mixture was at a temperature of 230° to 250° C. at normal pressure. After the grinding chamber the temperature of the steam/nitrogen mixture was 130° C. The amount of circulating gas was 1800 cubic meters (measured at 125° C.) per hour.

At a rotational speed of the rotor of the impact mill of 3550 s-1, a finely particulate MHEC was obtained having a bulk density of 403 g/l and a viscosity, measured as a 2% aqueous solution, of 87,500 mPa·s at 20° C. and 2.55 l/s (Haake Rotovisko). The powder obtained passed in an amount of 75.6 wt. % through a 0.063 mm sieve. The particle size determination by means of laser diffraction gave the following values: 4.7 wt. %<15.5 μm; 2.1 wt. %<11 μm and 0.74 wt. %<5.5 μm. The product moisture content was <2 wt. % referred to the total weight.

Example 2

A methylhydroxypropylhydroxyethyl cellulose gel (of methylhydroxy-propyl-hydroxyethyl cellulose with a DS (methyl)=1.54 and a MS (hydroxyethyl)=0.1 and a MS (hdyroxypropyl)=0.24) with a solids content of 22% referred to the total weight was ground and dried according to the aforedescribed procedure with a throughput of 142 kg of gel per hour. The incoming steam/nitrogen mixture was at a temperature of 250° to 270° C. at normal pressure. After the grinding chamber the temperature of the steam was 130° C. The amount of circulated gas was 1750 cubic meters (measured at 125° C.) per hour.

A finely particulate MHPHEC with a bulk density of 409 g/l and a viscosity measured as a 2% aqueous solution of 49800 mPa·s at 20° C. and 2.55 l/s (Haake Rotovisko) was obtained at a rotational speed of the rotor of the impact mill of 3550 s-1. The powder obtained passed in an amount of 78.8 wt. % through a 0.063 mm sieve, in an amount of 98.0 wt. % through a 0.125 mm sieve and in an amount of 99.9 wt. % through a 0.250 mm sieve. The moisture content of the product is <2 wt. % referred to the total weight.

Example MT3

A methylhydroxypropylhydroxyethyl cellulose gel (of methylhydroxypropyl-hydroxyethyl cellulose with a DS (methyl)=1.53 and a MS (hydroxyethyl)=0.28 and a MS (hydroxyproply)=0.29) with a solids content of 25% referred to the total weight was ground and dried according to the aforedescribed procedure with a throughput of 107 kg of gel per hour. The incoming water/nitrogen mixture was at a temperature of 210° to 230° C. at normal pressure. After the grinding chamber the temperature of the steam was 130° C. The amount of circulated gas was 1750 cubic meters (measured at 125° C.) per hour.

A finely particulate MHPHEC with a bulk density of 408 g/l and a viscosity measured as a 2% aqueous solution of 8200 mPa·s at 20° C. and 2.55 l/s (Haake Rotovisko) was obtained at a rotational speed of the rotor of the impact mill of 3550 s-1. The powder obtained passes in an amount of 71.8 wt. % through a 0.063 mm sieve, in an amount of 96.8 wt. % through a 0.125 mm sieve and an amount of 99.9 wt. % through a 0.250 mm sieve. The particle size determination by means of laser diffraction gave the following values: 4.5 wt. %<15.5 μm; 2.0 wt. %<11 μm and 0.6 wt. %<5.5 μm. The moisture content of the product is <2 wt. % referred to the total weight.

The viscosity of the products measured as a 2% aqueous solution at 20° C. and 2.55 l/s (Haake Rotovisko) in [mPa·s] is abbreviated in the following tables as V2. In the sieve analyses the cumulative sievings are given in wt. %. The laser diffraction values are also given in wt. %.

Examples 1, 4–8

The solids content in the gel (Examples 1, 4, 5) yields very good results as regards the particle-size distribution curve and the bulk density. By raising the solids content in the gel the bulk density can be adjusted smaller, which also results in a considerably coarser particle-size distribution curve with the same rotational speed of the rotor (Examples 6, 7, 8).

| Example | 1 | 4 | 5 | 6 | 7 | 8 |
|---|---|---|---|---|---|---|
| DS (M) | 1.51 | 1.51 | 1.51 | 1.51 | 1.51 | 1.51 |
| MS (HE) | 0.28 | 0.28 | 0.28 | 0.28 | 0.28 | 0.28 |
| Solids content Starting material, [%] | 45 | 45 | 45 | 45 | 45 | 45 |
| Solids content gel, [%] | 25 | 25 | 25 | 45 | 45 | 45 |
| Throughput gel, [kg/h] | 114 | 106 | 130 | 79 | 77 | 77 |
| T in front of mill, [° C.] | 230–250 | 230–245 | 250–270 | 155–175 | 160–180 | 170–190 |
| T after mill, [° C.] | 130 | 130 | 130 | 130 | 130 | 130 |
| Amount of circulating gas, 125° C. [m³/h] | 1800 | 1800 | 1700 | 1800 | 1800 | 1750 |
| Rotational speed of rotor, [l/s] | 3550 | 3175 | 2470 | 3550 | 3175 | 2470 |
| Sieve analysis | | | | | | |
| <0.25 mm | 99.9 | 99.9 | 99.0 | 99.5 | 99.4 | 98.2 |
| <0.2 mm | 99.8 | 99.8 | 98.1 | 98.6 | 98.0 | 93.9 |
| <0.16 mm | 99.4 | 99.3 | 95.4 | 96.3 | 95.0 | 88.4 |
| <0.125 mm | 97.3 | 95.8 | 89.7 | 91.6 | 89.2 | 79.9 |
| <0.1 mm | 93.0 | 89.8 | 82.3 | 83.5 | 80.2 | 69.3 |
| <0.063 mm | 75.6 | 66.1 | 55.9 | 54.7 | 52.9 | 43.3 |
| V2 | 87500 | 90150 | 93680 | 98691 | 91920 | 99280 |
| Product moisture content, [wt. %] | 1.0 | 1.0 | 1.1 | 1.7 | 1.7 | 1.9 |
| Bulk density, [g/l] | 403 | 397 | 395 | 266 | 264 | 261 |

Examples 9–14

The solids content in the gel (Examples 11 and 12) yields very good results as regards the particle-size distribution curve and the bulk density. A smaller solids content in the gel leads to a lower throughput of gel (Examples 9 and 10), since otherwise the power input of the mill would be too high. By increasing the solids content in the gel the bulk density can be adjusted lower (Examples 13 and 14).

| Example | 9 | 10 | 11 | 12 | 13 | 14 |
|---|---|---|---|---|---|---|
| DS (M) | 1.45 | 1.45 | 1.45 | 1.45 | 1.45 | 1.45 |
| MS (HE) | 0.21 | 0.21 | 0.21 | 0.21 | 0.21 | 0.21 |
| Solids content Starting material, [%] | 41.5 | 41.5 | 41.5 | 41.5 | 41.5 | 41.5 |
| Solids content gel, | 22.5 | 22.5 | 26 | 26 | 30 | 30 |

-continued

| Example | 9 | 10 | 11 | 12 | 13 | 14 |
|---|---|---|---|---|---|---|
| [%] | | | | | | |
| Throughput gel, [kg/h] | 53 | 54 | 103 | 107 | 110 | 99 |
| T after mill, [° C.] | 120 | 120 | 120 | 120 | 120 | 120 |
| Rotational speed of rotor, [l/s] | 4420 | 3540 | 4420 | 3540 | 4420 | 3540 |
| Sieve analysis | | | | | | |
| <0.25 mm | 100.0 | 99.9 | 100.0 | 100.0 | 100.0 | 99.9 |
| <0.2 mm | 99.9 | 99.6 | 99.9 | 100.0 | 100.0 | 99.9 |
| <0.16 mm | 99.8 | 98.5 | 99.9 | 99.9 | 100.0 | 99.5 |
| <0.125 mm | 98.9 | 95.0 | 99.8 | 99.6 | 99.8 | 97.4 |
| <0.1 mm | 96.8 | 90.0 | 98.8 | 98.1 | 98.0 | 92.8 |
| <0.063 mm | 86.6 | 70.4 | 92.9 | 88.1 | 85.9 | 71.3 |
| V2 | 13300 | 14700 | 15000 | 15900 | 16100 | 15900 |
| Product moisture content, [wt. %] | 1.4 | 1.5 | 2.1 | 1.6 | 2.1 | 1.6 |
| Bulk density [g/l] | 360 | 367 | 324 | 334 | 247 | 267 |

Examples 13–15

Methylhydroxyethyl cellulose gels (from methylhydroxyethyl cellulose with a DS (methyl)=1.57 and a MS (hydroxyethyl)=0.40) with different solids contents were ground and dried according to the aforedescribed procedure (T after mill: 130° C.).

MHEC with the following data were obtained at a rotational speed of the rotor of the impact mill of 3550 s$^{-1}$:

| Example | 15 | 16 | 17 |
|---|---|---|---|
| Solids content gel, [%] | 19 | 22 | 25 |
| Throughput gel, [kg/h] | 61 | 140 | 183 |
| Throughput MC, [kg/h] | 11.6 | 30.8 | 34.8 |
| Sieve analysis | | | |
| <0.25 mm | 98.5 | 99.7 | 99.8 |
| <0.2 mm | 97.3 | 99.3 | 99.6 |
| <0.16 mm | 94.8 | 98.3 | 99.0 |
| <0.125 mm | 87.6 | 94.8 | 96.8 |
| <0.1 mm | 76.9 | 89.0 | 91.1 |
| <0.063 mm | 40.4 | 65.5 | 69.2 |
| V2 | 66900 | 96300 | 91300 |
| Product moisture content, [wt. %] | 0.8 | 0.9 | 1.1 |
| Bulk density, [g/l] | 434 | 442 | 453 |

The maximum possible throughputs of gel were mill dried in each case. The throughput of gel (or MC) is considerably lower in Example 15 (solids content of gel: 19%) than in Examples 16 and 17. Furthermore, the particle-size distribution curve in Example 15 is substantially coarser and the viscosity is considerably less than that of the comparison samples.

The quietness in operation of the mill was very poor in Example 15, and as a result there were 5 breakdowns of the mill within 4.5 hours on account of too high a power input. In Examples 16 and 17 the silent running was very good.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing particulate water-soluble cellulose derivatives, comprising:
   a) forming a feed composition comprising 20 wt. % to 50 wt. % of a cellulose derivative, based on the total weight of the feed composition, and 50 wt. % to 80 wt. % of water, based on the total weight of the feed composition, wherein the cellulose derivative is at least one of swelled and dissolved in the feed composition;
   b) contacting, in a high rotational speed impact mill, the feed composition with a heat exchange gas and carrier gas, thereby converting the cellulose derivative of the feed composition into a solid state form of finely particulate particles, and converting at least a portion of the water of the feed composition into the vapor phase;
   c) separating the particulate cellulose derivative from the heat exchange gas and carrier gas; and
   d) optionally drying the particulate cellulose derivative.

2. The process of claim 1 wherein a sieve-free high rotational speed impact mill is used in step b).

3. The process of claim 1 further comprising adding a material selected from the group consisting of modifiers, additives and active substances, to the cellulose derivative before, during or after one or more of steps a) to c).

4. The process of claim 1 wherein a filter cake of cellulose derivative obtained from the reaction of cellulose with an alkylating or hydroxyalkylating agent and having a water content of 40 to 60 wt. %, based on total weight, is used in step a) to form the feed composition.

5. The process of claim 1 wherein the feed composition of step a) comprises 22 wt. % to 35 wt. % of the cellulose derivative, based on the total weight of the feed composition, and 65 wt. % to 78 wt. % of water, based on the total weight of the feed composition.

6. The process of claim 1 wherein the cellulose derivative is a cellulose ether.

7. The process of claim 1 wherein the cellulose derivative is methylhydroxyethyl cellulose with a DS (M) of 1 to 2.6 and a MS (HE) of 0.05 to 0.9.

8. The process of claim 1 wherein the cellulose derivative is methylhydroxypropylhydroxyethyl cellulose with a DS (M) of 1 to 2.6 and a MS (HP) of 0.05 to 1.2 and a MS (HE) of 0.05 to 0.9.

9. The process of claim 1 wherein the bulk density of the particulate cellulose derivative product is adjusted by the amount of the water present in the feed composition.

10. The process of claim 1 wherein at least one of: the water used to form the feed composition; the cellulose derivative used to form the feed composition; and the feed composition, is cooled.

11. The process of claim 1 wherein the carrier gas and heat exchange gas are each selected independently from air, steam and a mixture of steam and air.

12. The particulate cellulose derivative prepared according to the process of claim 1 wherein it has a particle-size distribution curve and wt. % cumulative sieving limits, as determined by means of sieving with a set of sieves, selected from the group consisting of:

Particle-size distribution curve A wt. % cumulative sieving
<0.25 mm 98.5–100
<0.2 mm 95–100
<0.16 mm 89–98
<0.125 mm 79–92
<0.1 mm 65–80
<0.063 mm 35–45;

Particle-size distribution curve B wt. % cumulative sieving
<0.25 mm 99–100
<0.2 mm 98–100
<0.16 mm 93–100
<0.125 mm 85–94.5
<0.1 mm 75–88
<0.063 mm 45–55;

Particle-size distribution curve C wt. % cumulative sieving
<0.25 mm 99–100
<0.2 mm 98.5–100
<0.16 mm 95.5–100
<0.125 mm 89–96.5
<0.1 mm 81–91.5
<0.063 mm 55–65;

Particle-size distribution curve D wt. % cumulative sieving
<0.25 mm 99.5–100
<0.2 mm 99.0.5–100
<0.16 mm 97.0–100
<0.125 mm 93–98
<0.1 mm 86–94.5
<0.063 mm 65–75;

Particle-size distribution curve E wt. % cumulative sieving
<0.25 mm 99.9–100
<0.2 mm 99.5–100
<0.16 mm 97.5–100
<0.125 mm 95.5–99.5
<0.1 mm 91–97
<0.063 mm 75–85;

and

Particle-size distribution curve F wt. % cumulative sieving
<0.25 mm 99.9–100
<0.2 mm 99.5–100
<0.16 mm 98.5–100
<0.125 mm 96.5–99.9
<0.1 mm 94–99.5
<0.063 mm 85–95.

13. The particulate cellulose derivative of claim 12 wherein it is a cellulose derivative selected from the group consisting of methyl cellulose, methylhydroxyethyl cellulose, methylhydroxypropyl cellulose, methylhydroxypropylhydroxyethyl cellulose and mixtures thereof.

14. The process of claim 1 wherein the particulate cellulose derivative has a bulk density of from 300 g/L to 500 g/L.

15. The process of claim 14 wherein the cellulose derivative is selected from methylhydroxyethyl cellulose, methylhydroxypropyl cellulose, methylhydroxypropylhydroxyethyl cellulose and mixtures thereof.

* * * * *